United States Patent [19]

Hrncirik

[11] Patent Number: 5,010,506

[45] Date of Patent: Apr. 23, 1991

[54] SPURIOUS LEVEL REDUCTION AND CONTROL METHOD FOR DIRECT DIGITAL SYNTHESIZERS

[75] Inventor: Dennis J. Hrncirik, Hiawatha, Iowa

[73] Assignee: Rockwell International Corporation, El Segundo, Calif.

[21] Appl. No.: 369,414

[22] Filed: Jun. 19, 1989

[51] Int. Cl.⁵ .............................................. G06F 15/31
[52] U.S. Cl. ...................................................... 364/721
[58] Field of Search ........................................... 364/721

[56] References Cited

U.S. PATENT DOCUMENTS

| | | | |
|---|---|---|---|
| 3,633,017 | 1/1972 | Crooke et al. | 364/721 |
| 4,328,554 | 5/1982 | Mantione | 364/721 |
| 4,476,536 | 10/1984 | Jones, Jr. | 364/721 |

Primary Examiner—David H. Malzahn
Attorney, Agent, or Firm—John J. Horn; M. Lee Murrah; H. Fredrick Hamann

[57] ABSTRACT

A direct digital synthesizer that outputs at least a predetermined output frequency related signal from a received digital signal, K, with minimum spurious signal levels. A storage device stores an initial phase value of the digital signal, K, and provides the initial phase value on an output thereof. An adder is provided having a first input for receiving the digital signal, K, having a second input and having an output which provides a summation of signals received on the first and second inputs. A latch has a first input connected to the output of the storage device, has a second input connected to the output of the adder and an output connected to the second input of the adder. The latch also has a third input for receiving a select signal for selecting between receiving on the first and second inputs of the latch. A control circuit provides the select signal in response to one of a plurality of predetermined parameters. The output frequency related signal is provided on the output of the latch. One or more detectors identify a power interrupt of the direct digital synthesizer or a change in the digital signal, K, and provides a detect signal to the control circuit. When a power interrupt or change in K is detected, the control circuit causes the latch to first receive the initial phase value on the first input thereof and then switch to the second input thereof for subsequent operations.

12 Claims, 1 Drawing Sheet

SPURIOUS LEVEL REDUCTION AND CONTROL METHOD FOR DIRECT DIGITAL SYNTHESIZERS

BACKGROUND OF THE INVENTION

The present invention relates to direct digital frequency synthesizers and, in particular, to a circuit and method for reducing the spurious levels of such direct digital frequency synthesizers.

Frequency synthesizer sub-systems using direct digital frequency synthesizers are used in modern communication systems. Direct digital frequency synthesizers have fast switching speeds, excellent temperature and aging stability and allows for phase continuous switching of the carrier signal. These characteristics make direct digital frequency synthesizers desirable for use in modern communication systems.

Prior art direct digital frequency synthesizers typically use a sinewave look-up table method. This method synthesizes a sinewave by using a phase accumulator to address a sine function look-up table stored in a read-only memory (ROM) or in a programmable read-only memory (PROM). The table converts the phase information provided by the accumulator into digital samples of a sinusoidal wave. The digital samples are converted by a digital to analog converter (DAC), which produces a staircase approximation of a sinewave in analog form. Each recalled sample differs from the previous sample by a constant phase increment and, thus different frequencies may be synthesized by changing the phase difference between the recalled samples. This is accomplished by changing the frequency control word (K value) to the phase accumulator.

Both the frequency and phase resolution of the synthesizer are determined by the word length of the phase accumulator. Typically, the word length of the accumulator maybe from 20 to 32 bits, but the number of accumulator output bits addressing the look-up table PROM is usually limited to 12 bits to minimize memory size, power, and space. It has been determined that the direct digital synthesizer output spurious levels are dependent upon the initial phase value at which the accumulator starts if the K value selected does not cause the least significant bit addressing the PROM to change. It has been observed that for a given output frequency of the direct digital synthesizer, that is, for a given K value, the spurious level out of the direct digital synthesizer may differ in amplitude when remeasured after several frequency changes, that is, changes in the K value input to the accumulator or when power is removed and reapplied to the circuit. This is caused by a different initial state or phase at which the accumulator starts. This has been a drawback in prior art direct digital synthesizers which put out undesired spurious levels. The present invention overcomes these drawbacks of the prior art.

SUMMARY OF THE INVENTION

It is an object of the present invention to provide a technique for reducing spurious frequency signals, that is, harmonic distortion in the output of a direct digital frequency synthesizer (also referred to as a direct digital synthesizer). It is an advantage of the present invention that such reducing of spurious frequency signals or levels can be accomplished during power up or during changes in the digital frequency control word, K, supplied to the direct digital synthesizer.

In general terms the direct digital synthesizer of the present invention has an accumulator which consists of an adder and a latch which increases the output "word" value incrementally with each clock-pulse of the circuit. This incremental value is set by the input frequency control signal "K". These output "words" sequentially address a PROM configured as a sinewave look-up table. With larger incremental values fewer memory locations are addressed during one period of the output sinewave which results in a higher frequency at the direct digital synthesizer output. For a lower frequency at the direct digital synthesizer output smaller incremental values are used and more memory locations are addressed during one period of the output sinewave.

When a change occurs in the frequency control signal "K" or when there is a power interrupt, the latch in the accumulator will contain unknown data. The present invention provides a frequency change or power interrupt detection circuit to provide a control signal to a multiplex latch having two inputs. During ordinary operation, the latch will accept data from the adder. When a change in K occurs due to either a frequency change or a power interruption, the control signal will switch the latch to accept data from a ROM, a PROM or other memory device which contains the initial phase for the new frequency for one clock cycle before switching the latch back to ordinary operation. Loading the proper initial phase "word" into the latch reduces at the output of the direct digital synthesizer spurious frequency signals or spurious levels.

More specifically the present invention is a direct digital synthesizer which outputs at least a predetermined output frequency related signal from a received digital signal, K. The direct digital synthesizer has a means for storing an initial phase value of the digital signal, K, the means for storing providing the initial phase value on an output thereof. Also included in the synthesizer is a means for adding which receives on a first input the digital signal, K, and has a second input. An output of the means for adding provides a summation of signals received on the first and second inputs. Also included is a means for latching which has a first input connected to the output of the means for storing the initial phase value. A second input is connected to the output of the means for adding. The means for latching has an output connected to the second input of the means for adding. The means for latching also has a third input for receiving a select signal for selecting between receiving on either the first or second inputs of the means for latching. A means for providing the select signal in response to at least one predetermined parameter is provided and the output frequency related signal occurs at the output of the means for latching.

The direct digital synthesizer may further have a means for detecting a power interrupt of the direct digital synthesizer. The means for detecting provides a power interrupt detect signal to the means for providing the select signal. The means for providing the select signal causes the means for latching to first receive the initial phase value on the first input and then switch to the second input for subsequent operation. The direct digital synthesizer may also have a means for detecting a change in the digital signal, K, indicative of a frequency change. The means for detecting may also provide a frequency change detect signal to the means for providing the select signal. The means for providing the select signal then causes a means for latching to first receive the initial phase value on its first input and then switch to its second input for subsequent operation. Two separate means for detecting can be used or one means for detecting various different parameters can be used.

The direct digital synthesizer also has a means for providing a sinewave look-up table having an input connected to the output of the means for latching and provides on an output of the means for providing a sinewave look-up table a digital amplitude/frequency signal. A digital to analog converter has an input connected to the output of the means for providing the sinewave look-up table and provides on an output thereof an output frequency signal. For operation of the direct digital synthesizer it also contains a means for clocking which is connected to the means for latching, the means for providing the select signal, the means for providing a sinewave look-up table and the means for digital to analog conversion.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
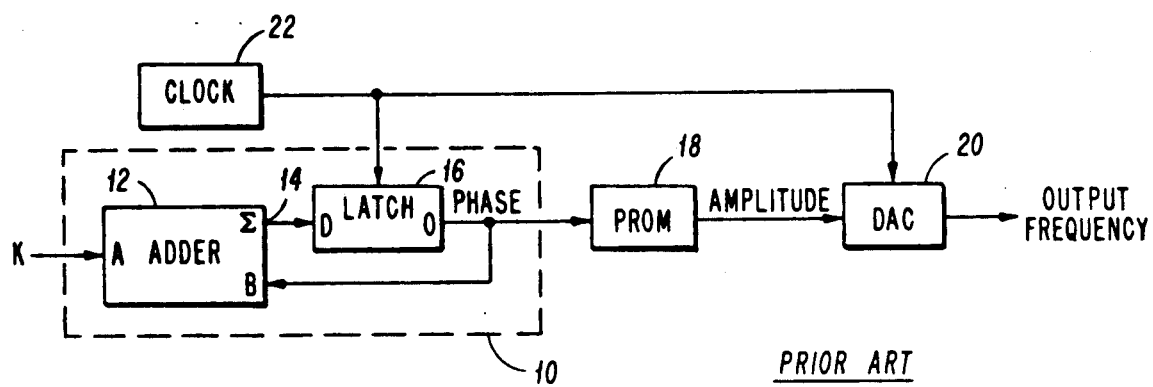
FIG. 1 is a block diagram depicting a typical prior art direct digital synthesizer.

The present invention has general applicability but is most advantageously utilized in direct digital synthesizers. A typical prior art direct digital synthesizer is depicted in FIG. 1. The direct digital synthesizer consists of a phase accumulator 10 which receives an input digital frequency control word, designated "K". The accumulator 10 consists of an adder 12 having a first input A which receives the frequency control, K and a output 14 which is the summation of the signals received on the input A and on a second input B. The output 14 of the adder 12 is connected to an input D of a latch 16. An output O of a latch 16 is connected to the input B of the adder 12. The output O of the latch 16 is also the output of the accumulator 10 and as shown in FIG. 1 outputs a digital word referred to as "phase". A PROM 18 has an input connected to the output of the accumulator 10 and operates as a phase to amplitude converter. An output (designated "amplitude") of the PROM 18 is connected to an input of a digital to analog converter 20 (DAC), the output of which is the output frequency of the direct digital synthesizer. Also a clock 22 provides appropriate synchronization clock pulses to the latch 16 and the digital to analog converter 20 and other components (not shown) for operation of the direct digital synthesizer. In this direct digital synthesizer output spurious levels are dependent upon the phase accumulators initial value if the K value (which determines the direct digital synthesizer output frequency) selected does not cause the least significant bits addressing the PROM 18 to change. For these K values, setting the initial phase value would be desirable and would make the output spectrum predictable, repeatable and would reduce the overall worst cased spurious level. In the prior art direct digital synthesizer depicted in FIG. 1 the spurious levels are unpredictable since the initial accumulator value or phase occurs randomly with power turn-on or with changes in K, the frequency input.

Figure 2:
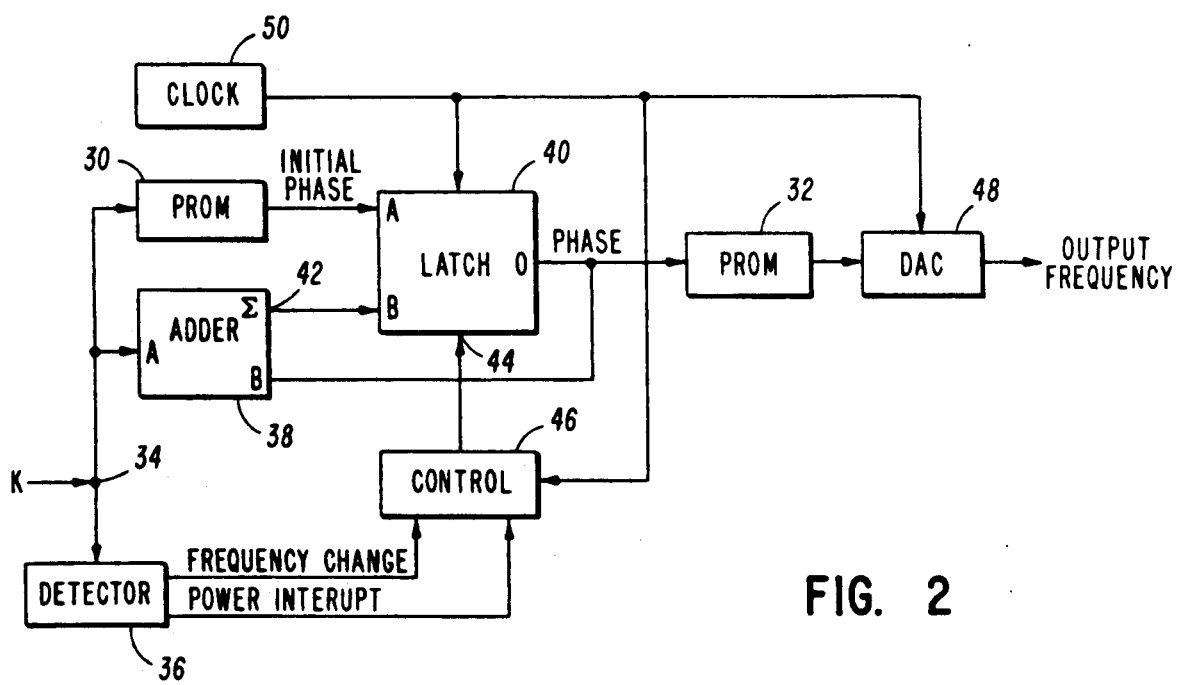
FIG. 2 is a block diagram of a direct digital synthesizer according to the present invention.

The present invention as depicted in FIG. 2 overcomes the above-described drawback in prior art direct digital synthesizers by providing the appropriate initial phase value for K in the presence of a change in the value of K or for interruption of power. Other parameters or factors could also be monitored and compensated for in the novel direct digital synthesizer of the present invention.

The solution which is provided by the present invention consists of the following steps. First the K value (frequency) selected determines the appropriate initial phase value for minimum spurious levels. A storage device is utilized and/or other decoding hardware from which the desired phase value can be obtained whenever a frequency change or power interruption occurs. Finally, the circuitry permits a loading of any phase value in the direct digital synthesizer.

The initial phase value for optimum spurious performance is depended upon the phase to amplitude value stored in the PROM 32. Depending on the available memory size, the phase to amplitude converter 32 may use a 90, 180 or a full 360 degree sinewave table, with anywhere from typically 8-12 input address bits and 8-12 output bits. The stored values can be predistorted before rounding and truncated to the closest integer. After choosing a sinewave table, the spurious performance can be determined for each frequency or K value of interest by computer simulation such as by Fourier analysis. Spurious amplitude and location is checked for each initial phase value until the value which produces the lowest spurious level is found.

As shown in FIG. 2 the present invention has an input terminal 34 which receives the value of K. The input terminal 34 is connected to the input of a detector 36, to the A input of an adder 38, and to the input of the PROM 30 which acts as a means for storing an initial phase value of the digital signal K. The initial phase value is provided on an output of the PROM 30 which is connected to the input A of a latch 40. A second input B of the latch 40 is connected to an output 42 of the adder 38. An output O of the latch 40 is connected to a second input B of the adder 38. The adder 38 and the latch 40 form an accumulator, an output of which has a signal referred to as an output frequency related signal, reference "PHASE" in FIG. 2. The latch 40 also has an input 44 which is connected to the output of a control circuit 46 which provides a select signal on its output and responds to one of a plurality of predetermined parameters. Such parameters can be either a frequency change in the frequency signal K or a power interrupt to the direct digital synthesizer. Such changes in parameters can be detected by detector 36. Other parameters can be monitored and a select signal can be provided in response to a change in these parameters by the control circuit 46. The select signal received on input 44 of the latch 40 causes the latch 40 to first receive the initial phase value on its first input A and then to switch to the second input B for subsequent operation of the direct digital synthesizer. Thus it can be appreciated that the spurious levels are reduced by always using the appropriate initial phase value for starting the accumulator, that is the adder 38 and latch 40 in the direct digital synthesizer of the present invention.

The PROM 32 or phase to amplitude converter has a sinewave look-up table and has a input connected to the output O of the latch 40. An output of the PROM 32 is connected to the input of the digital to analog converter 48. The output of the digital to analog converter 48 is the output frequency of the direct digital synthesizer. A clock 50 provides synchronization clock pulses to the latch 40, the control circuit 46 and the digital to analog converter 48 for proper operation of the direct digital synthesizer.

The operation of the direct digital synthesizer which provides at least a predetermined output frequency related signal from a received digital signal K has the steps of:

providing the digital signal K;
providing an initial phase value of the digital signal K and storing the initial phase value;
phase accumulating the digital signal K;
providing an output frequency related signal from the phase accumulation of the digital signal K; and
in response to the occurrence of at least one predetermined parameter, restarting the accumulating of a digital signal K from the stored initial phase value.

The method may further comprise a step of providing a sinewave look-up table for converting the output frequency related signal to a digital amplitude/frequency signal. In a further step the digital amplitude/frequency signal is converted to an output frequency signal by digital to analog conversion.

More specifically the method has the step of detecting a power interrupt, the power interrupt being a predetermined parameter and/or detecting a change in the digital signal K indicative of a frequency change, the change in the digital signal K also being a predetermined parameter.

It is to be appreciated that although the circuit depicted in FIG. 2 can use either an accumulator with a multiplexed input latch or a resettable accumulator with an adder between the accumulator output and the PROM, as a means for setting the initial accumulator phase, what is important is that the accumulator phase word which address the PROM be specifically set to certain value. This overcomes the problem in the prior art which allows the initial accumulator phase to be unknown or improper resulting in high-spurious levels. Therefore it is an advantage of the present invention that the circuit includes a means for storing and resetting the correct phase word to result in spurious reduction. The proper initial phase word depends on both the phase to amplitude converter and the desired output frequency. After the phase to amplitude table or sine conversion is chosen, the spurious performance can be determined for each output frequency verse initial phase. This can be done for example by Fourier analysis or direct measurement. The worse case spurious level can be reduced, and individual spurious signals significantly reduced if the proper initial phase occurs. It may be determined that only a few phase values need be stored or directly decoded from the input frequency data. Then with the proper detection circuitry, whenever the input frequency data changes or the power is interrupted, the initial accumulator phase word to the phase to amplitude converter can be set to the predetermined value resulting in the lowest possible spurious levels.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

I claim:

1. A direct digital synthesizer that outputs at least a predetermined output frequency related signal from a received digital signal, K, comprising:

means for permanently storing for continuing reference an initial phase value of the digital signal, K, said means for storing providing said initial phase value on an output thereof;

means for adding having a first input for receiving said digital signal, K, having a second input, and having an output which provides a summation of signals received on said first and second inputs;

means for latching having a first input connected to said output of said means for storing said initial phase value, having a second input connected to said output of said means for adding and having an output connected to said second input of said means for adding, said means for latching also having a third input for receiving a select signal for selecting between receiving on said first and second inputs of said means for latching;

means for detecting changes in predetermined parameters related to spurious signal levels in the output of said direct digital synthesizer and generating a spurious level detect signal;

means for providing said select signal in response to said spurious level detect signal indicative of changes in said predetermined parameters; and said output frequency related signal being provided on said output of said means for latching.

2. The direct digital synthesizer according to claim 1, wherein, said means for detecting is operative for detecting power interrupts of said direct digital synthesizer which comprise said predetermined parameter and wherein, when said means for detecting identifies a power interrupt, said means for providing said select signal causes said means for latching to first receive said initial phase value on said first input thereof and then switch to said second input thereof for subsequent operation.

3. The direct digital synthesizer according to claim 1, wherein, said means for detecting is operative for detecting changes in said digital signal, K, which comprise said predetermined parameter and wherein, when said means for detecting identifies a change in said digital signal, K, said means for providing said select signal causes said means for latching to first receive said initial phase value on said first input thereof and then switch to said second input thereof for subsequent operation.

4. The direct digital synthesizer according to claim 1, wherein, said direct digital synthesizer further comprises means for providing a sinewave look-up table having an input connected to said output of said means for latching and providing on an output of said means for providing a sinewave look-up table, a digital amplitude/frequency signal.

5. The direct digital synthesizer according to claim 4, wherein, said direct digital synthesizer further comprises means for digital to analog conversion having an input connected to said output of said means for providing a sinewave look-up table and providing on an output of said means for digital to analog conversion an output frequency signal.

6. The direct digital synthesizer according to claim 5, wherein, said direct digital synthesizer further comprises means for clocking connected to said means for latching, said means for providing said select signal, said means for providing a sinewave look-up table and said means for digital to analog conversion.

7. A direct digital synthesizer that outputs at least a predetermined output frequency related signal from a received digital signal, K, comprising:
   means for storing an initial phase value of the digital signal, K, said means for storing providing said initial phase value on an output thereof;
   means for adding having a first input for receiving said digital signal, K, having a second input and having an output which provides a summation of signals received on said first and second inputs;
   means for latching having a first input connected to said output of said means for storing said initial phase value, having a second input connected to said output of said means for adding and an output connected to said second input of said means for adding, said means for latching also having a third input for receiving a select signal for selecting between receiving on said first and second inputs of said means for latching;
   means for providing said select signal in response to one of a plurality of predetermined parameters;
   said output frequency related signal being provided on said output of said means for latching;
   first means for detecting a power interrupt of said direct digital synthesizer, one of said parameters being said power interrupt and said first means for detecting providing a power interrupt detect signal to said means for providing said select signal, and when a power interrupt is detected said means for providing said select signal causing said means for latching to first receive said initial phase value on said first input thereof and then switch to said second input thereof for subsequent operation; and
   second means for detecting a change in said digital signal, K, indicative of a frequency change, one of said parameters being said change in said digital signal, K, and said second means for detecting providing a frequency change detect signal to said means for providing said select signal, and when a change in said digital signal, K, occurs said means for providing said select signal causing said means for latching to first receive said initial phase value on said first input thereof and then to switch to said second input thereof for subsequent operation.

8. The direct digital synthesizer according to claim 7, wherein, said direct digital synthesizer further comprises means for providing a sinewave look-up table having an input connected to said output of said means for latching and providing on an output of said means for providing a sinewave look-up table a digital amplitude/frequency signal.

9. The direct digital synthesizer according to claim 8, wherein, said direct digital synthesizer further comprises means for digital to analog conversion having an input connected to sad output of said means for providing a sinewave look-up table and providing on an output of said means for digital to analog conversion an output frequency signal.

10. The direction digital synthesizer according to claim 9, wherein, said direct digital synthesizer further comprises means for clocking connected to said means for latching, said means for providing said select signal, said means for providing a sinewave look-up table and said means for digital to analog conversion.

11. A direct digital synthesizer that outputs at least a predetermined output frequency related signal from a received digital signal, K, comprising:
   means for storing an initial phase value of the digital signal, K, said means for storing providing said initial phase value on an output thereof;
   means for adding having a first input for receiving said digital signal, K, having a second input, and having an output which provides a summation of signals received on said first and second inputs;
   means for latching having a first input connected to said output of said means for storing said initial phase value, having a second input connected to said output of said means for adding and having an output connected to said second input of said means for adding, said means for latching also having a third input for receiving a select signal for selecting between receiving on said first and second inputs of said means for latching;
   means for detecting power interrupts of said direct digital synthesizer and providing signal in response to power interrupts; and
   said output frequency related signal being providing on said output of said means for latching.

12. A direct digital synthesizer that outputs at least a predetermined output frequency related signal from a received digital signal, K, comprising:
   means for storing an initial phase value of the digital signal, K, said means for storing providing said initial phase value on an output thereof;
   means for adding having a first input for receiving said digital signal, K, having a second input, and having an output which provides a summation of signals received on said first and second inputs;
   means for latching having a first input connected to said output of said means for storing said initial phase value, having a second input connected to said output of said means for adding and having an output connected to said second input of said means for adding, said means for latching also having a third input for receiving a select signal for selecting between receiving on said first and second inputs of said means for latching;
   means for detecting changes in said digital signal, K, indicative of frequency changes and providing said select signal in response to these changes; and
   said output frequency related signal being provided on said output of said means for latching.

* * * * *